United States Patent

Neff et al.

[11] Patent Number: 5,841,885
[45] Date of Patent: Nov. 24, 1998

[54] PRINT AND METHOD AND APPARATUS FOR PRINTING, STORING AND RETRIEVING AN IMAGE RECORD

[75] Inventors: Lynn Kwasny Neff, Rochester; Anthony Ronald Berardi, Rush, both of N.Y.

[73] Assignee: Eastman Kodak Company, Rochester, N.Y.

[21] Appl. No.: 816,474

[22] Filed: Mar. 13, 1997

Related U.S. Application Data

[63] Continuation of Ser. No. 413,147, Mar. 29, 1995, abandoned.

[51] Int. Cl.⁶ .............................. G06K 9/00; G03B 17/24; G03B 27/52
[52] U.S. Cl. ..................... 382/112; 382/305; 358/302; 355/40; 396/371; 348/64
[58] Field of Search ................................ 382/100, 112, 382/232, 305, 325; 364/525; 348/96, 64, 105, 110, 107, 112; 358/305, 302; 354/105–107; 355/40, 77; 235/375, 380, 462; 380/50–51, 54–55; 396/311, 429, 315

[56] References Cited

U.S. PATENT DOCUMENTS

| | | | |
|---|---|---|---|
| 4,344,683 | 8/1982 | Stemme | 354/106 |
| 4,417,811 | 11/1983 | Hamer | 355/77 |
| 4,663,518 | 5/1987 | Borror et al. | 235/487 |
| 4,689,696 | 8/1987 | Plummer | 358/333 |
| 4,728,984 | 3/1988 | Daniele | 355/6 |
| 4,823,163 | 4/1989 | Rollet et al. | 355/41 |
| 4,841,340 | 6/1989 | Tokuda | 355/38 |
| 4,896,186 | 1/1990 | Tokuda | 355/40 |
| 4,904,853 | 2/1990 | Yokokawa | 235/487 |
| 4,951,086 | 8/1990 | Hicks | 355/41 |
| 5,051,773 | 9/1991 | Davis | 355/40 |
| 5,060,980 | 10/1991 | Johnson et al. | 283/70 |
| 5,091,966 | 2/1992 | Bloomberg et al. | 382/21 |
| 5,128,525 | 7/1992 | Stearns et al. | 235/454 |
| 5,130,745 | 7/1992 | Cloutier et al. | 354/106 |
| 5,157,482 | 10/1992 | Cosgrove | 358/54 |
| 5,160,952 | 11/1992 | Iwashita et al. | 354/76 |
| 5,168,147 | 12/1992 | Bloomberg | 235/456 |
| 5,184,227 | 2/1993 | Foley | 358/302 |
| 5,221,833 | 6/1993 | Hecht | 235/494 |
| 5,223,891 | 6/1993 | Fierstein et al. | 355/77 |
| 5,231,506 | 7/1993 | Manico et al. | 358/302 |
| 5,245,165 | 9/1993 | Zhang | 235/454 |
| 5,264,683 | 11/1993 | Yoshikawa | 354/105 |
| 5,281,993 | 1/1994 | Crochetierre et al. | 355/40 |
| 5,319,408 | 6/1994 | Shiota | 354/298 |
| 5,321,773 | 6/1994 | Kopec et al. | 383/30 |
| 5,383,027 | 1/1995 | Harvey et al. | 355/40 |
| 5,389,989 | 2/1995 | Hawkins et al. | 354/106 |
| 5,406,325 | 4/1995 | Parulski et al. | 355/77 |
| 5,420,924 | 5/1995 | Berson et al. | 235/380 |
| 5,428,423 | 6/1995 | Clark | 355/40 |
| 5,471,533 | 11/1995 | Wang et al. | 235/462 |

FOREIGN PATENT DOCUMENTS

| | | |
|---|---|---|
| 0 547 357 | 6/1993 | European Pat. Off. . |
| 0599558 | 6/1994 | European Pat. Off. . |

OTHER PUBLICATIONS

S. Ohyama, Y. Nagae, and M. Takasaka, Electronics and Communications in Japan, Optical Sheet Memory System, pp. 73–85.

Patent Abstracts of Japan, vo. 16, No. 326, (E–1235), 16 Jul. 1992 & JP–A–04 096568 (Ricoh Co. Ltd), 27 Mar. 1992.

*Primary Examiner*—Leo H. Boudreau
*Assistant Examiner*—Bhavesh Mehta
*Attorney, Agent, or Firm*—Frank Pincelli; David A. Novais

[57] ABSTRACT

An image recordation and retrieval system and method of producing prints. The system includes a scanner for scanning an original image so as to obtain a digital record file of the image; a printer for printing a print from the original image so as to produce a print; and means for placing the digital record on the print.

38 Claims, 4 Drawing Sheets

PRINT AND METHOD AND APPARATUS FOR PRINTING, STORING AND RETRIEVING AN IMAGE RECORD

This is a Continuation of application Ser. No. 08/413,147, filed 29 Mar. 1995, now abandoned.

FIELD OF THE INVENTION

This invention is directed to prints and means for storing, retrieving, and/or printing the image and information regarding the image on the print.

BACKGROUND OF THE INVENTION

In today's typical photographic system, prints are provided to the consumer along with negatives which are used to provide reprints of the image on the photographic print or slide. The negatives are small, cut strips of the developed film, typically from about 3 to 4 inches in length. Quite often the negative strips are separated from the prints and are lost or easily misplaced, thus making it difficult to obtain reprints of a selected print. One suggestion of overcoming this problem is to make reprints using the original print. This is quite often done by the use of a scanner which scans the image and places the obtained information into a digital data file whereby the information can be used by a variety of digital-type equipment, for example, digital printers, CRTs, computers, etc. However, the use of a print to produce copies does not contain all the information present when the image was initially captured. This becomes even more important with the introduction of low cost reflection scanners. In order to obtain optimum quality in a reprint, the customer should use the original source of the image, i.e., the negative, which created the photographic print for any additional uses.

The information scanned from an optically or digitally generated reflection print is limited for a variety of reasons. For example, there are sharpness limitations of the reflection media, which can limit the potential sharpness of a print which uses the scanned information. Also, the tonal range contained on the reflection print is often difficult to capture, even in high quality reflection scanners. Additionally, the dynamic range of a reflection print is limited due to the current reflection print tone scales. The high contrast tone scales tend to clip the highlight and shadow detail contained in the original source of the image. The color balance of a reflection print is very dependent upon the chemical and electronic processing applied during its creation. The color problems in the print may or may not be correctable in an application using the information scanned from the reflection print. Physical problems in the print, such as fingerprints, scratches, etc., which may have been placed on a print through normal use and storage may cause defects in the original digital scan. Additionally over time, photographic prints can significantly deteriorate due to environmental storage conditions, such as heat and humidity. Finally, enough digital information may not be available from the original photographic print to obtain high quality reprints or enlargements from a small section of the print original. This would be most noticeable in an enlargement or when cropping only a part of the reflection for a duplicate.

Best reprints are made when the original source of the image is utilized. The original source, by definition, is the first generation of the image as captured by the media or device. In the case of a photographic system, the original source is the photographic negative. The negative has the best potential sharpness that the capture device can provide. It also has the best dynamic range and color correction capabilities, limited only by the captured device. There are also fewer potential physical problems in the original source which may lead to artifacts in the reproduced image, as handling of the original source typically minimized.

There is also a need to enhance and enable further image enjoyment and usage by having the information efficiently available in a machine readable format for use with display, processing, transmission and hard copy output devices.

There are various methods currently available to obtain machine-readable information concerning an image. For example, photo CD, disc, film scanners, and print scanners. These current systems by themselves are not optimal for storage and retrieval of image information. Print scanners do not provide the same quality of information as one could achieve from a original source image. Additionally, high quality transparency scanners for negatives or slides are currently very costly and require the user to match the print image with the appropriate negative and requires the transition of the image data into an efficient compression format which maintains a complete digital record of the transparency in an efficient storage space. Photo CDs are reflective storage vehicles which efficiently store each image, but are costly and are not readily available to retail consumers.

Thus, there is desire to provide an improved storage and retrieval system to enhance and enable additional use and enjoyment of images and to have this information available with each print.

SUMMARY OF THE INVENTION

In one aspect of the invention there is provided an image recordation and retrieval system. The system includes a scanner for scanning an original image so as to obtain a digital record file of the image; a printer for printing a print from the original image so as to produce a print; and means for placing the digital record on the print.

In another aspect of the present invention there is provided a method of recording and retrieving an image from an original source, comprising the steps of:
a) scanning the original image source and producing a digital record representative of the image;
b) producing a print from the original source; and
c) placing said digital record of said image on the print.

In yet another aspect of the present invention there is provided an image recording and retrieval system comprising a print having an image which was produced from an original image source and a digital record of the image which was also obtained from the original image source.

BRIEF DESCRIPTION OF THE DRAWINGS

FIG. 1b is the back plan view of the print of FIG. 1a;

DETAILED DESCRIPTION OF THE INVENTION

Figure 1A:
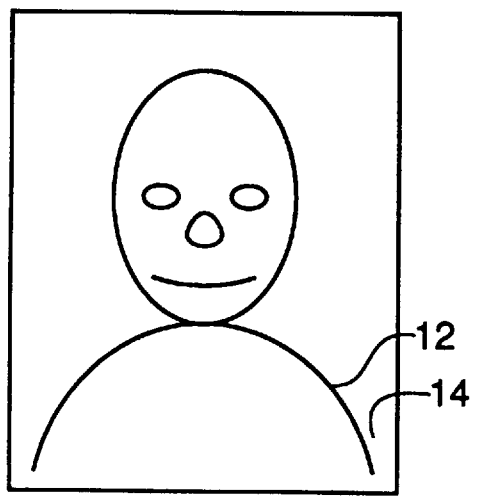
FIG. 1a is a plan view of the front surface of a photographic print made in accordance with the present invention.
Figure 1B:
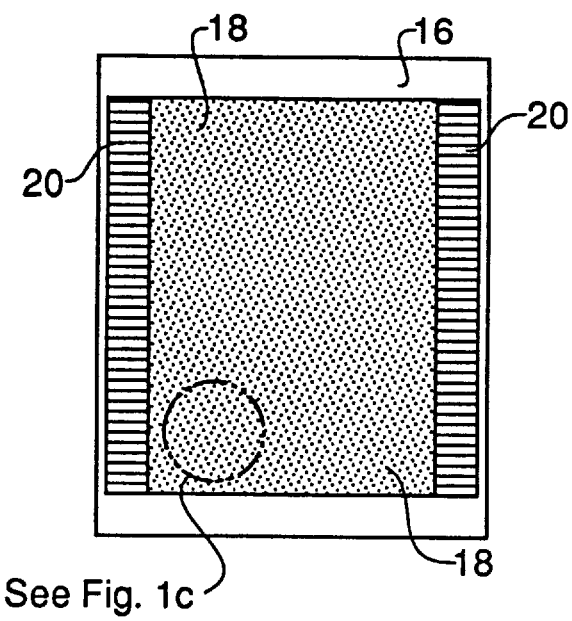
Figure 1C:
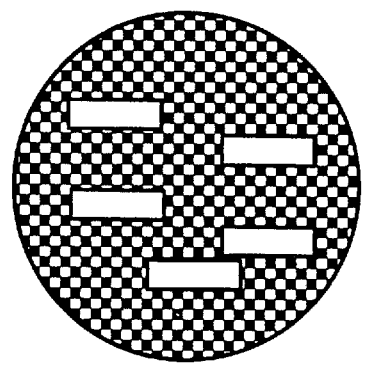
FIG. 1c is an enlarged view of the circular portion illustrated in FIG. 1b.

Referring to FIGS. 1a, 1b, and 1c, there is illustrated a print 10 made in accordance with the present invention having an image 12 formed on the front side. In the embodiment illustrated the image 12 is produced by any photographic process as is well known in the art. For example, the image 12 may have been produced in a minilab where 35 mm photographic films are processed and printed onto photographic paper. However, the print 10 may also be formed by any other photographic apparatus used to make photographic prints. The photographic print 10 also has a back side 16 wherein a digital record 18 is provided which contains digital information of the image 12. Digital record 18 may be placed on the print 10 in any manner available. An example of one suitable manner in which the digital record may be formed is described in the article entitled "*Optical Memory System*", by Ohyama, Nagae, and Takasaka. In this system, a digital record is formed by a series of closely spaced dots which are representative of the bits of the digital image. Tracking bars 20 along the side of the digital record allow for easy alignment of the data through a scanner used to read the information, or for alignment correction after the scan has been completed. The digital record may be printed directly on the back side 16 of the photographic print 10, or may be placed on a paper or sticker which is then attached to the back side 16 of the photographic print 10 in any desired manner. On a typically sized photographic print, i.e., approximately 4"×6", a 600 DPI printer can produce a digital pattern capable of storing approximately 800K Bytes of digital data. A film negative scanned at 1024 by 1536 pixels and compressed by commonly used methods such as JPEG or photo CD can be compressed to under 800 K Bytes of data. This amount of information can be easily decompressed and used to generate high quality enlargements with or without cropping, as well as duplicates of the image on the photographic print 10. It is, of course, understood that the image on the print may be a single image or a plurality of images formed on a print, for example, an index print, the particular image recorded being any desired image.

Figure 2:
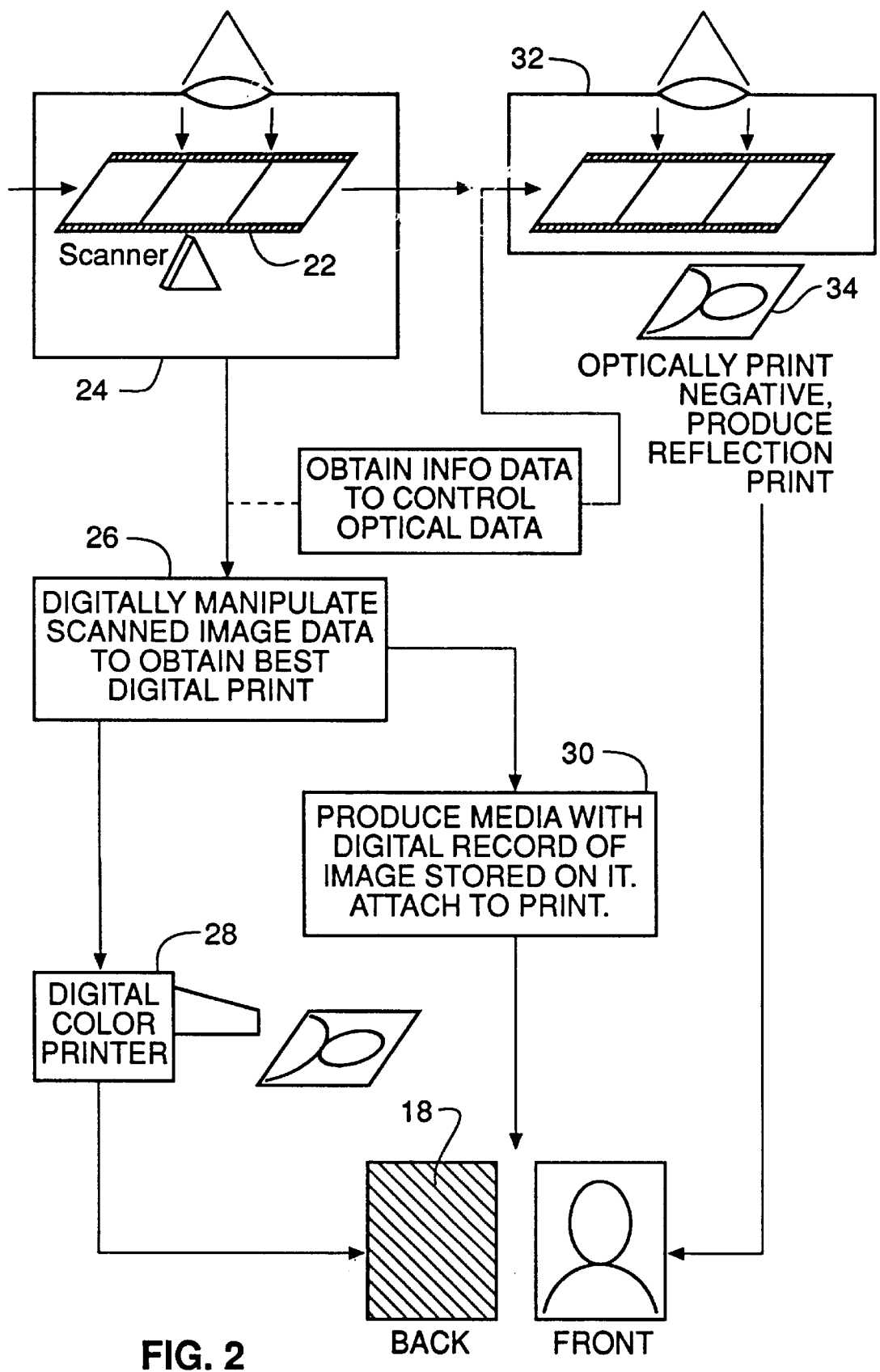
FIG. 2 is a schematic diagram illustrating how the print of FIGS. 1a, 1b, and 1c may be produced.

Referring to FIG. 2, there is illustrated a schematic diagram of a system used to produce a photographic print 10 made in accordance with the present invention. A negative filmstrip 22 which has been previously developed, is first passed through a scanner 24 wherein a digital record file of the images on the negative filmstrip is obtained. Examples of suitable scanners are illustrated by the Rapid Film Scanner, Model 2035, sold by the Eastman Kodak Company, and the PCD 2000 Film Scanner also sold by the Eastman Kodak Company. Alternatively, the scanner could comprise a CCD (charged coupled device) array in photographic printer which is used to obtain data for controlling the optical printing of the negative at a subsequent station, can also be used for obtaining a digital record file which contains information representative of the image on the filmstrip. The digital record file may be manipulated to obtain the best representation of the image, as illustrated by box 26. This manipulation can include automatic algorithms which are used to enhance the image as well as specific changes or modifications made by the operator. Also, instructional information can be added to the digital record such as printing conditions for best printing of the image. It is, of course, understood that any other desired instruction or other information may be added. For example, but not by way of limitation, the date, name, location and/or a message may be added for printing along with the image. Thereafter, the digital record is sent to a digital printer 28 for printing. An example of a suitable digital printer is illustrated by the XLS 8600 Thermal Printer sold by the Eastman Kodak Company. Alternatively, or in addition thereto, the digital record file may be forwarded onto to device 30 wherein a physical digital record 18 of the image may be produced. For example, a digital record 18 as prepared by the optical memory system, previously described, may be placed on a sheet of material, which is then affixed to the back side 16 of the print 10, for example by adhesive. Alternatively, the digital record 18 may be imprinted directly on the back side 16 of the reflection print 10.

After the negative filmstrip 22 has passed through scanner 24 (or the scanning portion of a printer), it is sent to the optical print gate 32 wherein an optical print 34 is produced. Thereafter, in a like manner as previously described with respect to the photographic print produced by the digital color printer, the digital record 18 is placed on the back side 16 of the print 10 produced by the optical printing system.

Figure 3:
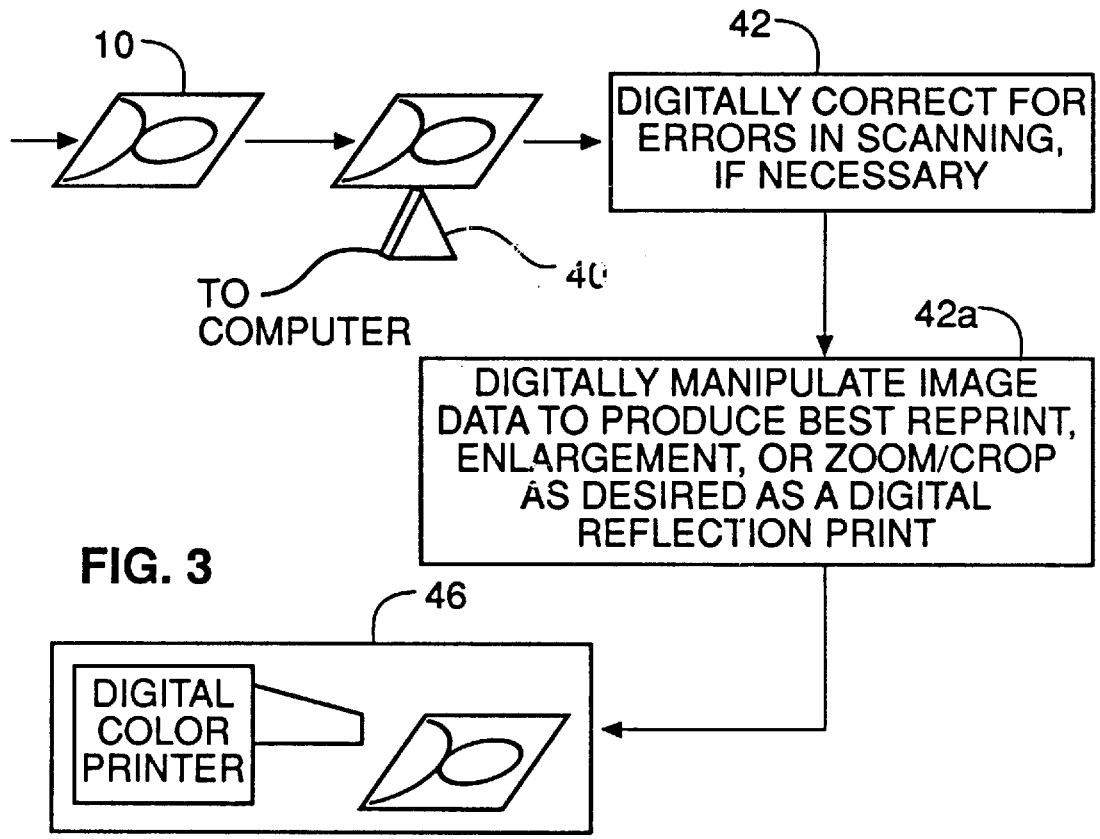
FIG. 3 is a flow diagram on how reprints of the original image may be made in accordance with the present invention.

Referring to FIG. 3, there is illustrated in schematic form, a system for reproducing and/or recreating prints or enlargements from the original photographic print 10. The print 10 is first sent to an appropriate scanner 40 where the digital record 18 placed on the back side of print 10 is read. Thereafter, as indicated by boxes 42, 42a, the digital information contained on the digital record 18 can be corrected for any modifications or corrections desired. The digital information is then sent on to an appropriate printer 46 wherein a print is produced. It is, of course, understood that since the information is in digital form, any desired manipulation of the digital information contained in the digital record 18 can be made as can be done with any other digital data file including, but not limited to, cropping, enlarging, revising the color, changing the color balance, correcting for defects, etc. The fact that the information is in digital form also allows for easy manipulation of the initial image without any substantial further work on the users part.

Figure 4:
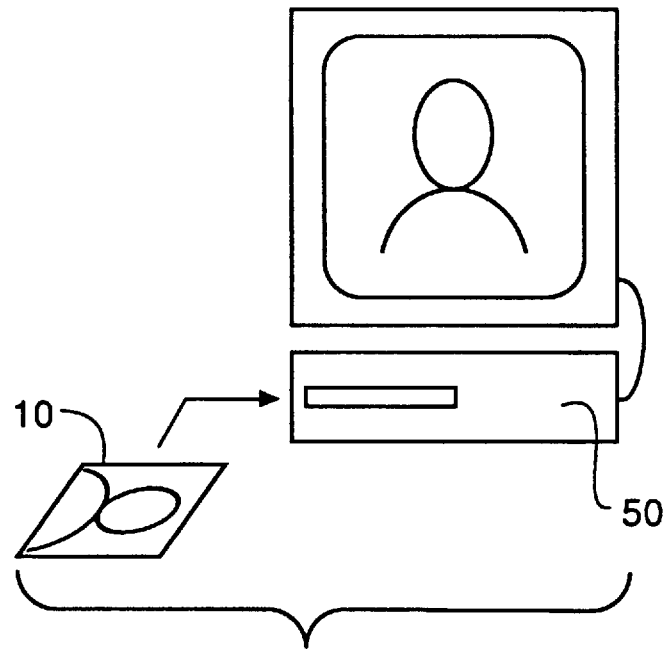
FIG. 4 is a schematic diagram of how the digital record print of FIGS. 1a, 1b, and 1c may be viewed in accordance with the present invention.
Figure 5:
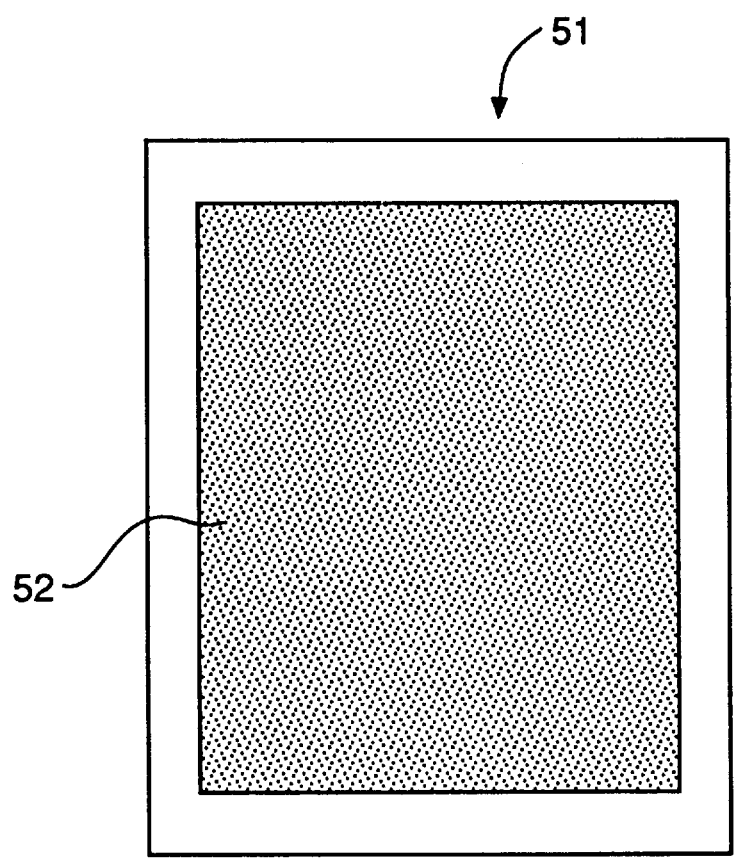
FIG. 5 is a elevational view of an modified print made in accordance with the present invention.

Referring to FIGS. 4 and 5, there is illustrated an alternate schematic on how the photographic print 10 may be used. For example, if the digital record 18 has been provided in some other suitable format, for example, as contained on a magnetic media (such as a magnetic recording layer) or on a digital optical media (such as digital optical tape) which been placed onto the print, the digital record 18 can be read directly into a computer 50 whereby it may be shown on a CRT, or placed in an optical scanner or other type of reader wherein the information is relayed onto a TV or other CRT-type monitor device. In particular, FIG. 5 illustrates the back of modified print 51 made in accordance with the present invention. The print 51 having a magnetic layer 52, on which the digital record 18 has been placed.

As can be seen, the present invention not only allows for the convenient storage and use of images, it also allows for the reproduction of an image which is superior in quality than the image being view. This can be important in situations where the visual image on the print degrades in quality and/or in situations where the original print was made using a printing technique which produces images of relatively low resolution. For example, where the original image is made using an ink jet, electrostatic or electrophotographic printer.

In the embodiment illustrated, only the image record file is placed on the print. If desired, other information may also provided on the print. For example, but not by way of limitation, a code can be placed on the print so that only certain individuals or pieces of equipment can read the information, or maybe certain instructional codes can be provided for specific scanners or printers. Additionally, a copyright notice can be placed in the digital record so as to inform the user that the image is copyright protected.

The present invention provides a storage and retrieval system which avoids the necessity of retaining and storing negatives and having to relate a specific negative to a print. Also the present invention provides the user with a source of image information that relates directly to the original image source.

It is to be understood that various other changes and modifications may be made without departing from the scope of the present invention, the present invention being limited by the following claims:

Parts list:
10 . . . print
12 . . . image
16 . . . back side
18 . . . digital record
20 . . . tracking bars
22 . . . negative filmstrip
24 . . . scanner
26 . . . box
28 . . . digital printer
34 . . . optical print
40 . . . scanner
42,42a . . . boxes
46 . . . printer
50 . . . computer
51 . . . print
52 . . . magnetic layer

We claim:

1. A photographic print made on photographic paper having an image and a digital record which is representative of the image, said photographic print being made from an original photographic film negative having an image thereon, and said digital record being made from the same original photographic film negative by scanning said original photographic film negative, said digital record containing data sufficient so as to reproduce the image on the photographic print.

2. A photographic print according to claim 1, wherein said digital record is made using a digital optical printer which prints a series of closely spaced dots which are representative of the bits of the digital image.

3. A photographic print according to claim 1, wherein said digital record is made using a magnetic write head which writes digital information on to a magnetic layer.

4. A photographic print according to claim 1, wherein said digital record further includes instructional information regarding printing of the image.

5. A photographic print according to claim 1, wherein said digital record further includes a code so that reading and/or writing of the image is restricted.

6. A photographic print according to claim 5, wherein said digital record is restricted as to the individual that may have access or to the type of equipment that is used to read and or write the image.

7. An image storage and retrieval system comprising a photographic print on photographic paper having an image produced from an original photographic film negative, and a digital record integrally formed on the photographic print which is obtained from the original photographic film negative by scanning the original photographic film negative, said digital record containing data sufficient so as to reproduce the image on the photographic print.

8. An image storage and retrieval system comprising:
a scanner for scanning an original photographic film negative having an image so as to obtain a digital record file of the image on said original photographic film negative;
a printer for printing a photographic print on photographic paper from said original photographic film negative so as to produce a photographic print of said image; and
means for placing the digital record of the image on the photographic print, said digital record containing data sufficient so as to reproduce the image on the photographic print.

9. An image storage and retrieval system according to claim 8, wherein said means for placing the digital record on the print comprises a digital optical printer which prints a series of closely spaced dots which are representative of the bits of the digital image.

10. An image storage and retrieval system according to claim 8, wherein said means for placing the digital record on the print comprises a magnetic write head which writes digital information on to a magnetic layer.

11. An image storage and retrieval system according to claim 8, wherein said digital record further includes instructional information regarding printing of the image.

12. An image storage and retrieval system according to claim 8, wherein said digital record further includes a code so that reading and/or writing of the image is restricted.

13. An image storage and retrieval system according to claim 12, wherein said digital record is restricted as to the individual that may have access or to the type of equipment that is used to read and or write the image.

14. A method of storing and retrieving an image from an original photographic film negative comprising the steps of:
a) scanning the original photographic film negative and producing a digital record representative of the image from said original photographic film negative;
b) optically producing a photographic print on photographic paper with the image from said original photographic film negative; and
c) placing said digital record of said image on said photographic print, said digital record containing data sufficient so as to reproduce the photographic image on the photographic print.

15. A method according to claim 14, further comprising the step of reproducing said image from said digital record on the back side of said print.

16. A photographic print having a photographic image on a front side of the photographic print and a digital record on a back side of the photographic print which is representative of the image placed on the front side, said digital record including instructional information regarding printing of the image and data sufficient so as to reproduce the photographic image on the photographic print.

17. An image storage and retrieval system comprising a photographic print made on photographic paper having an image on a front side of the photographic print which was produced from an original photographic film negative, and a digital record integrally formed on a back side of the photographic print which was obtained from the original photographic film negative by scanning said original photographic film negative, said digital record containing data sufficient so as to reproduce the photographic image on the photographic print.

18. A photographic print made on photographic paper having an image and a digital record which is representative of the image, said print and digital record being made from the same photographic film source, said digital record containing data sufficient so as to reproduce the photographic image on the photographic print, said digital record including instructional information for printing of said image.

19. A print according to claim 18, wherein said digital record is made using a digital optical printer which prints a series of closely spaced dots which are representative of the bits of the digital image.

20. A print according to claim 18, wherein said digital record is made using a magnetic write head which writes digital information on to a magnetic layer.

21. A print according to claim 18, wherein said digital record further includes a code so that reading and/or writing of the image is restricted.

22. A print according to claim 21, wherein said digital record is restricted as to the individual that may have access or to the type of equipment that is used to read and or write the image.

23. An image recording and retrieval system comprising a photographic print having an image and a digital record integrally formed on the photographic print which is obtained from an original photographic film negative, said digital record including instructional information regarding printing of the image.

24. An image storage and retrieval system comprising:
   a scanner for scanning an original photographic film source having an image so as to obtain a digital record file of the image on said original photographic film source;
   a printer for printing a print from the original photographic film source so as to produce a print; and
   means for placing a digital record of the digital record file on the print source, said digital record containing data sufficient so as to reproduce the photographic image on the photographic print and instructional information regarding printing of said image.

25. An image storage and retrieval system according to claim 24, wherein said means for placing the digital record on the print comprises a digital optical printer which prints a series of closely spaced dots which are representative of the bits of the digital image.

26. An image storage and retrieval system according to claim 24, wherein said means for placing the digital record on the print comprises a magnetic write head which writes digital information on to a magnetic layer.

27. An image storage and retrieval system according to claim 24, wherein said digital record further includes a code so that reading and/or writing of the image is restricted.

28. An image storage and retrieval system according to claim 27, wherein said digital record is restricted as to the individual that may have access or to the type of equipment that is used to read and or write the image.

29. A method of storing and retrieving an image from an original photographic film source, the method comprising the steps of:
   a) scanning the original photographic film source and producing a digital record representative of the image from the original photographic film source;
   b) producing a photographic print on photographic paper from said image on said original photographic film source; and
   c) placing said digital record of said image from said original photographic film source on said photographic print, said digital record containing data sufficient so as to reproduce the photographic image on the print and instructional information regarding printing of said image.

30. A method according to claim 29, further comprising the step of reproducing said image from said digital record on the back side of said print.

31. A photographic print having an image on a front side of the photographic print, and a digital record on a back side of the photographic print which is representative of the image placed on the front side and is obtained by scanning the front side of said photographic print, said photographic print and said digital record being made from the same original photographic film negative, said digital record containing data sufficient so as to reproduce the image on the photographic print.

32. An image recording and retrieval system comprising a photogaphic print having an image on the front side of the print which was produced from an original photographic film negative and a digital record integrally formed on a back side of the photographic print which was formed from the original photographic film negative by scanning the original photographic film negative, said digital record containing data sufficient so as to reproduce the photographic image on the photographic print.

33. An image storage and retrieval system comprising a photographic print made on photographic paper having an image which was produced from an original photographic film source and a digital record which was obtained from the original photographic source, said digital record containing data sufficient so as to reproduce the photographic image on the photographic print and instructional information regarding printing of said image.

34. A method of storing and retrieving an image from an original photographic film negative comprising the steps of:
   a) scanning the original photographic film negative and producing a digital record representative of the image on the original photographic film negative;
   b) digitally modifying said digital record;
   c) producing a photographic print from the image on said original photographic film negative; and
   d) placing said digital record of said image from said original photographic film negative on said photographic print, said digital record containing data sufficient so as to reproduce the image on the photographic print.

35. A method of storing and retrieving an image from an original photographic film source comprising the steps of:
   a) scanning the original photographic film source and producing a digital record representative of the image from said original photogaphic film source;
   b) providing instructional information to said digital record for controlling printing of said image from said original photogaphic film source;
   c) producing a photographic print on photographic paper from said image on said original photographic film source; and
   d) placing said digital record of said image from said original photogaphic film source on said photographic print, said digital record containing data sufficient so as to reproduce the image from said original photogaphic film source on the photographic print.

36. A method of storing and retrieving an image from an original source comprising the steps of:
   a) providing a photographic print made on photographic paper having an image and a digital record representative of the image, said digital record containing instructional information with respect to printing of said image;
   b) scanning said digital record, said digital record containing instructional information with respect to printing of said image and data sufficient so as to reproduce the photographic image on the photographic print; and c) producing a photographic print made on photographic paper of said image in accordance with said instructional information.

37. A method of storing and retrieving an image from an original photographic film negative comprising the steps of:
   a) providing a photographic print made on photographic paper having an image and a digital record representative of said image;
   b) scanning said digital record;
   c) modifying said digital record so as modify said image; and
   d) printing an image in accordance with said modified digital record, said digital record containing data sufficient so as to reproduce the photographic image on the photographic print.

38. A method of storing and retrieving an image from an original photographic film negative comprising the steps of:
   a) providing a photographic print made on photographic paper having an image and a digital record representative of said image;
   b) scanning said digital record;
   c) modifying said digital record so as modify said image; and
   d) producing a photographic print made on photographic paper having said modified digital record, said digital record containing data sufficient so as to reproduce the photographic image on the photographic print.

* * * * *